(12) United States Patent
Fard

(10) Patent No.: US 11,391,896 B2
(45) Date of Patent: Jul. 19, 2022

(54) OPTICAL INPUT/OUTPUT ARRANGEMENT FOR PHOTONIC INTEGRATED CIRCUITS

(71) Applicant: ARIZONA BOARD OF REGENTS ON BEHALF OF THE UNIVERSITY OF ARIZONA, Tucson, AZ (US)

(72) Inventor: Erfan M. Fard, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 17/056,578

(22) PCT Filed: May 16, 2019

(86) PCT No.: PCT/US2019/032629
§ 371 (c)(1),
(2) Date: Nov. 18, 2020

(87) PCT Pub. No.: WO2019/222476
PCT Pub. Date: Nov. 21, 2019

(65) Prior Publication Data
US 2021/0208347 A1 Jul. 8, 2021

Related U.S. Application Data

(60) Provisional application No. 62/673,380, filed on May 18, 2018.

(51) Int. Cl.
*G02B 6/42* (2006.01)
(52) U.S. Cl.
CPC .................. *G02B 6/4213* (2013.01)

(58) Field of Classification Search
CPC .................................................... G02B 6/4213
See application file for complete search history.

(56) References Cited

U.S. PATENT DOCUMENTS

| 5,852,691 A * | 12/1998 | Mackie | G02B 6/12007 |
| | | | 385/39 |
| 8,855,449 B1 | 10/2014 | Roth | |
| 9,122,006 B1 * | 9/2015 | Roth | G02B 6/126 |
| 2010/0002980 A1 * | 1/2010 | Fini | G02B 6/02338 |
| | | | 385/11 |
| 2016/0246005 A1 * | 8/2016 | Liu | G02B 6/2766 |

* cited by examiner

*Primary Examiner* — Sung H Pak
(74) *Attorney, Agent, or Firm* — Stuart H. Mayer; Mayer & Williams PC

(57) ABSTRACT

In accordance with a method for transferring optical signals to and from an optical component incorporated in a photonic integrated circuit (PIC), an incoming optical signal in a first polarization state is received at a splitter section of a polarization splitter rotator (PSR). The splitter section causes the optical signal to be directed to a first waveguide of a pair of waveguides of the PSR. One of the waveguides rotates a polarization state of an optical signal traversing therethrough into an orthogonal polarization state and the other waveguide maintains a polarization state of an optical signal traversing therethrough. The incoming optical signal is directed from the first waveguide to the optical component. An outgoing optical signal is received in a second waveguide of the pair such that the outgoing optical signal traverses the second waveguide and the splitter section to be output by the PSR.

21 Claims, 6 Drawing Sheets

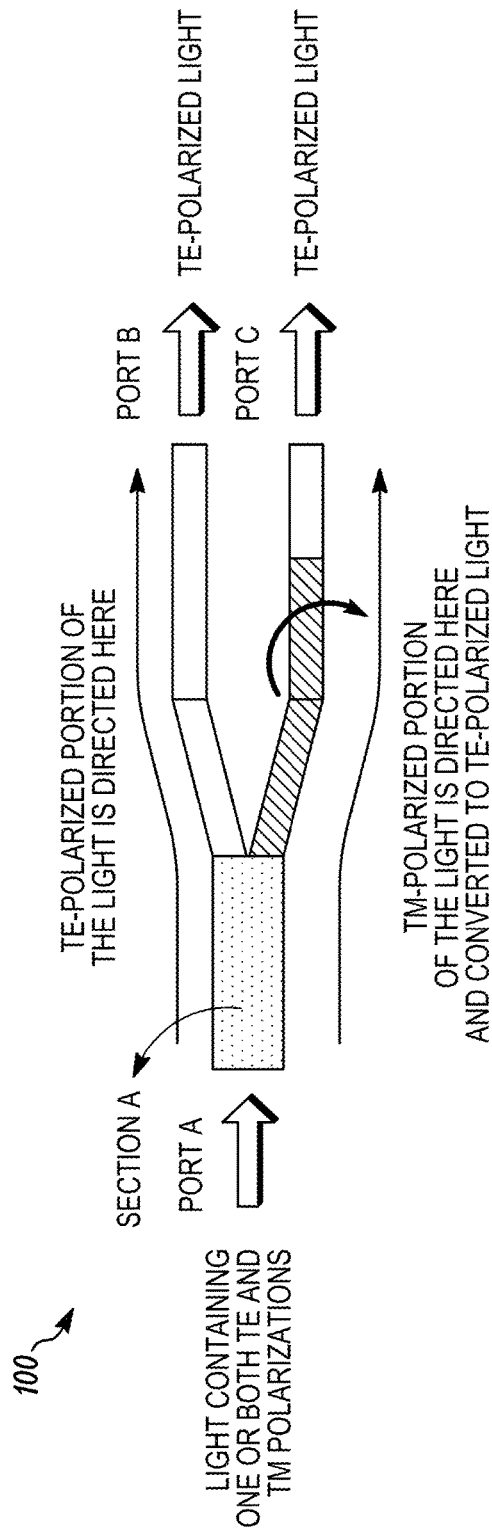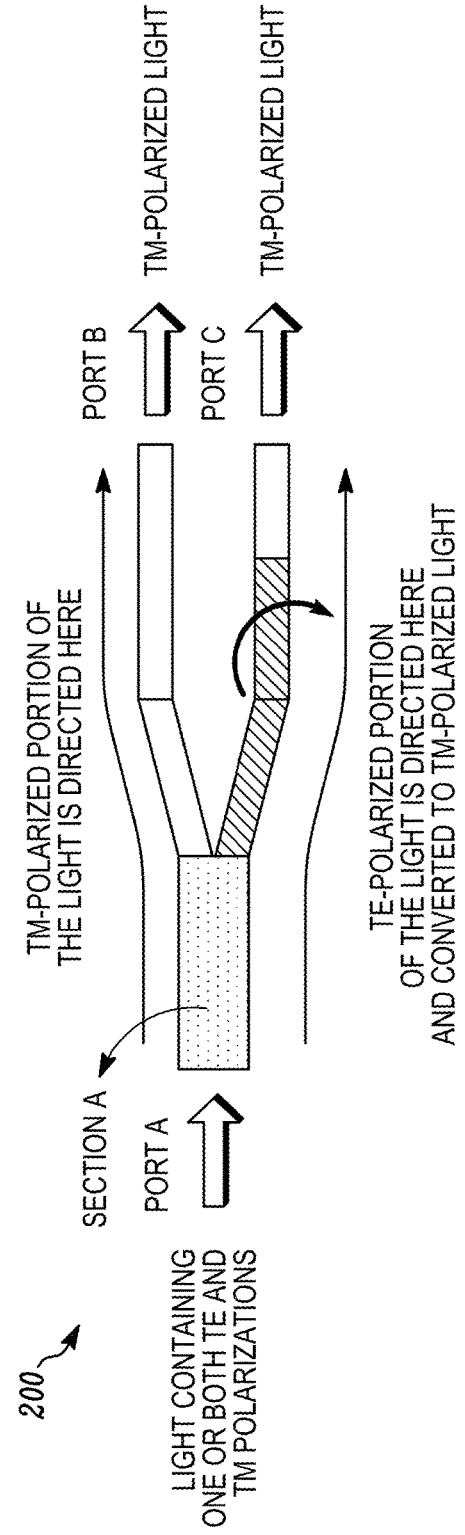

OPTICAL INPUT/OUTPUT ARRANGEMENT FOR PHOTONIC INTEGRATED CIRCUITS

CROSS REFERENCE TO RELATED APPLICATION

This application claims the benefit of U.S. Provisional Application Ser. No. 62/673,380, filed May 18, 2018, the contents of which are incorporated herein by reference.

GOVERNMENT FUNDING

This invention was made with government support under Grant No. FA8650-15-2-5220, awarded by Air Force Material Command. The government has certain rights in the invention.

BACKGROUND

An important problem in optical packaging involves the optical interconnection of planar-integrated photonic integrated circuits (chip-chip connections) and the connection of such circuits to the external world. Photonic integrated circuits (PICs) refer to waveguide-based photonic components, including optical integrated devices such as lasers, optical amplifiers, switches, filters, modulators, splitters, phase shifters, variable attenuators, detectors, and the like. PICs can also include integration with semiconductor devices such as CMOS electronic devices. PICs allow systems with high complexity and multiple functions to be integrated on a single substrate to thereby allow the generation, detection, propagation and modulation of both optical and electrical signals. PICs may employ a variety of different material systems, including silicon, silicon nitride, polymer, silicon dioxide, ion-exchange glass, lithium niobate, InP, GaAs, and graphene, and optical interconnection processes should be compatible with these material systems.

Input and output (I/O) coupling devices, such as fiber edge couplers or fiber grating couplers, are often used to transfer signals onto and off of the PIC. Such devices have increasingly become a bottleneck due to the limited pitch of optical fibers, which, for instance, can be 125 µm or more for an SMF-28 fiber array.

SUMMARY

In accordance with one aspect of the subject matter described herein, a method is provided for transferring optical signals to and from an optical component incorporated in a photonic integrated circuit (PIC). In accordance with the method, an incoming optical signal in a first polarization state is received at a splitter section of a polarization splitter rotator (PSR). The splitter section causes the incoming optical signal to be directed to a first waveguide branch section of a pair of waveguide branch sections of the PSR. One of the waveguide branch sections rotates a polarization state of an optical signal traversing therethrough into an orthogonal polarization state and the other waveguide branch section maintains a polarization state of an optical signal traversing therethrough. The incoming optical signal is directed from the first waveguide branch section to the optical component. An outgoing optical signal is received in a second waveguide branch section in the pair of waveguide sections such that the outgoing optical signal traverses the second waveguide branch section and the splitter section to be output by the PSR.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a simplified schematic diagram of one example of a polarization-splitter-rotator (PSR) that rotates incoming TM-polarized light to outgoing TE-polarized light when used in a conventional manner.

FIG. 3 shows a simplified schematic diagram of another example of a PSR, which in this case rotates incoming TE-light to TM-polarization light when used in a conventional manner.

DETAILED DESCRIPTION

Figure 1:
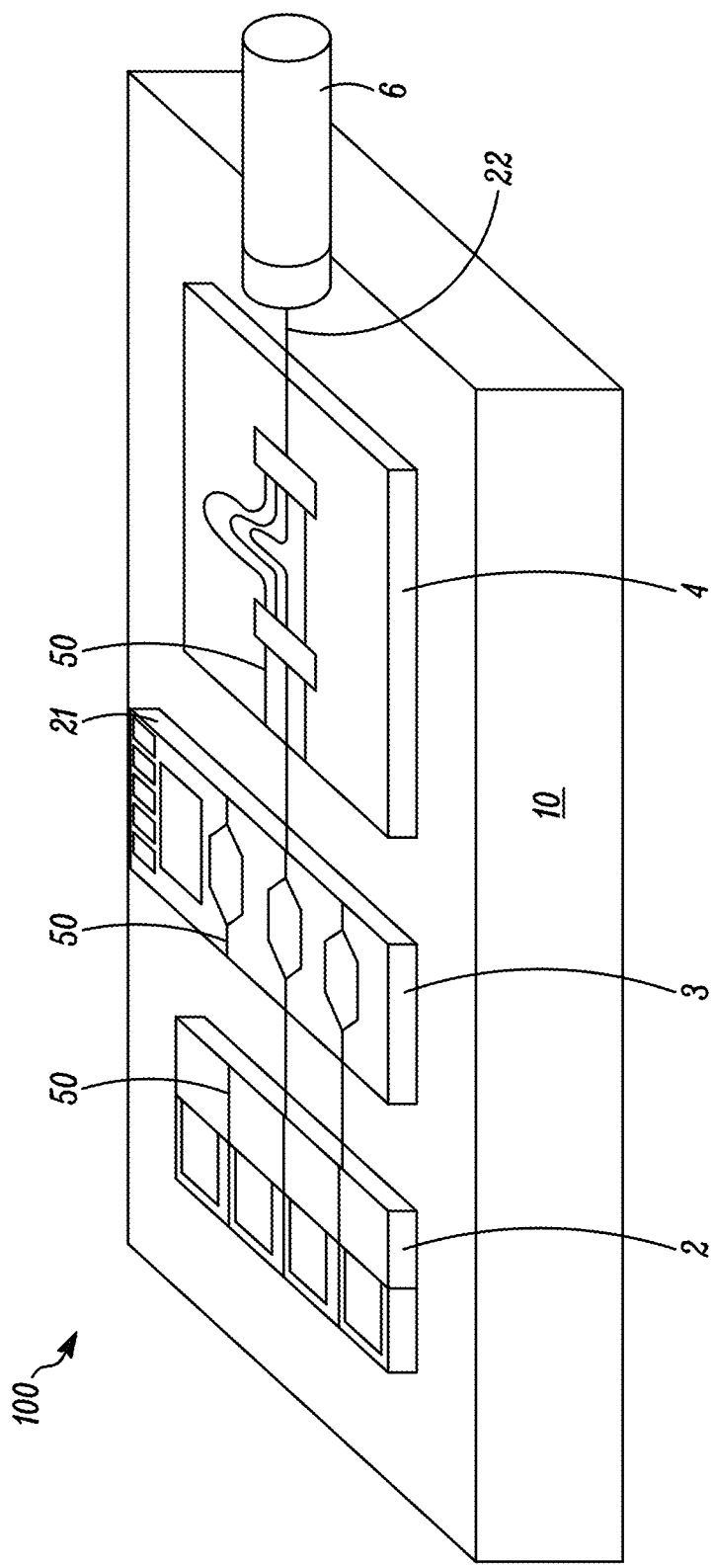
FIG. 1 shows one example a photonic integrated circuit (PIC) that includes multiple photonic systems that are integrated on different substrates.

FIG. 1 shows one example a photonic integrated circuit (PIC) 100 that includes multiple photonic systems that are integrated on different substrates ("chips") 2, 3 and 4 and which contain lateral single-mode waveguides 50. The waveguides 50 positioned on different chips are interconnected with one another and externally connected to an input/output optical fiber 6. The various photonic components 2, 3 and 4 are mounted on a substrate 10 that serves as a component carrier.

Described herein is a method and optical arrangement for transferring optical signals to and from optical components incorporated in a photonic integrated circuit (PIC), such as between optical fiber 6 and photonic chips 2,3 and 4 in FIG. 1. As explained in more detail below, a polarization splitter rotator (PSR) is used to combine incoming and outgoing optical signals on a photonic integrated circuit. As a result, a photonic circuit can use a single optical input/output coupling device, such as a fiber edge coupler or fiber grating coupler to transfer signals onto and off the PIC. In this way the number of available I/O ports can be roughly doubled in some cases, significantly increasing the utilization of the capacity that is available on the PIC.

A polarization splitter rotator (PSR) is a device that converts two orthogonally polarized modes of light received at the input into two spatially separated modes with the same polarization. PSRs have been traditionally used to separate the polarizations of input light entering an input port of a PIC into different output ports. FIG. 2 shows a simplified schematic diagram of one example of a PSR 100 that rotates incoming TM-polarized light to outgoing TE-polarized light when used in a conventional manner, generally in accordance with either Multi-Mode Interference (MMI) or Coupled-Mode Theory (CMT). The PSR 100 includes a splitter section usually in the form of a directional coupler having an input port A, a standard output port B and a polarization-rotation section at output port C. In conventional use, input light is received at the input port A that is in either the TE or TM polarization states (or both TE and TM polarization states). The TE-polarized portion of the light entering port A is directed to port B and the TM-polarized portion of the light entering port A is directed toward port C and is also rotated by 90 degrees to become TE-polarized. In this way TE-polarized light exits both output ports B and C of the PSR 100. The majority of integrated photonic devices operate with TE-polarized light.

FIG. 3 shows a simplified schematic diagram of another example of a PSR 200, which in this case rotates incoming TE-light to TM-polarization light when used in a conventional manner. The PSR 200 includes a splitter section usually in the form of a directional coupler having an input port A, a standard output port B and a polarization-rotation section at output port C. Once again, in conventional use input light is received at the input port A that is in either the TE or TM polarization states (or both TE and TM polarization states). In this case, however, the TM-polarized portion of the light entering port A is directed to port B and the TE-polarized portion of the light entering port A is directed toward port C and is also rotated by 90 degrees to become TM-polarized. In this way TM-polarized light exits both output ports of the PSR 200.

Instead of using PSRs such as those described above for the purpose of providing output light at two output ports in a common polarization state (TE or TM), when employed in accordance with the techniques described herein, port A in the splitter section is used as both an input and output port and one of the ports B and C is used as an input port while the other of the ports B and C is used as an output port. This is illustrated in FIGS. 4-7

Figure 4:
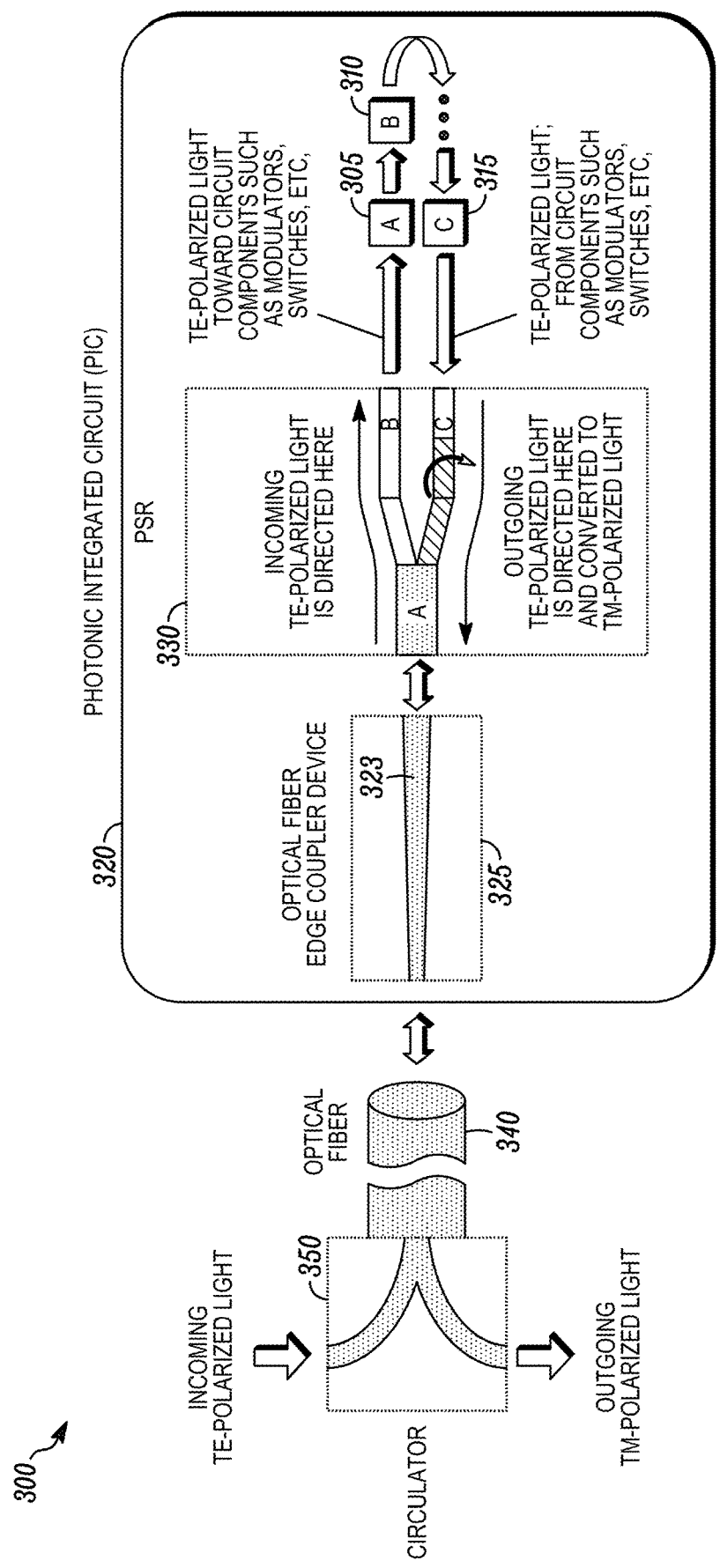
FIG. 4 shows one example of an optical arrangement having illustrative photonic components that operate using TE-polarized light.

FIG. 4 shows one example of a optical system 300 having illustrative photonic components 305, 310 and 315 located on a substrate such as PIC 320. More generally, of course, any number and type of photonic chips may be employed. An edge coupler 325 (e.g., an optical fiber edge coupler) and a PSR 330 are also located on the PIC 320. In this example PSR 330 is configured as shown in FIG. 2, but is used in a different manner. Incoming TE-polarized light from an external device is provided by an optical waveguide 340 (e.g., an optical fiber) to the edge coupler 325. The edge coupler 325 includes a tapered waveguide 323 that communicates the TE-polarized light from the optical waveguide 340 to port A of the splitter section of the PSR 330. The incoming TE-polarized light is directed to the output port B the PSR 330, where it exits the PSR 330 in the TE polarization state and is provided to photonic components 305, 310 and 315. TE-polarized light from the photonic components 305, 310 and 315 is received by port C of the polarization-rotator section of the PSR 330, which rotates the TE-polarized light to TM-polarized light. The TM-polarized light then exits port A of the PSR 330, enters the edge coupler 325 and exits the PIC 300 through optical waveguide 340. An external optical circulator 350 may be used to separate the incoming TE-polarized light from the outgoing TM-polarized light.

Figure 5:
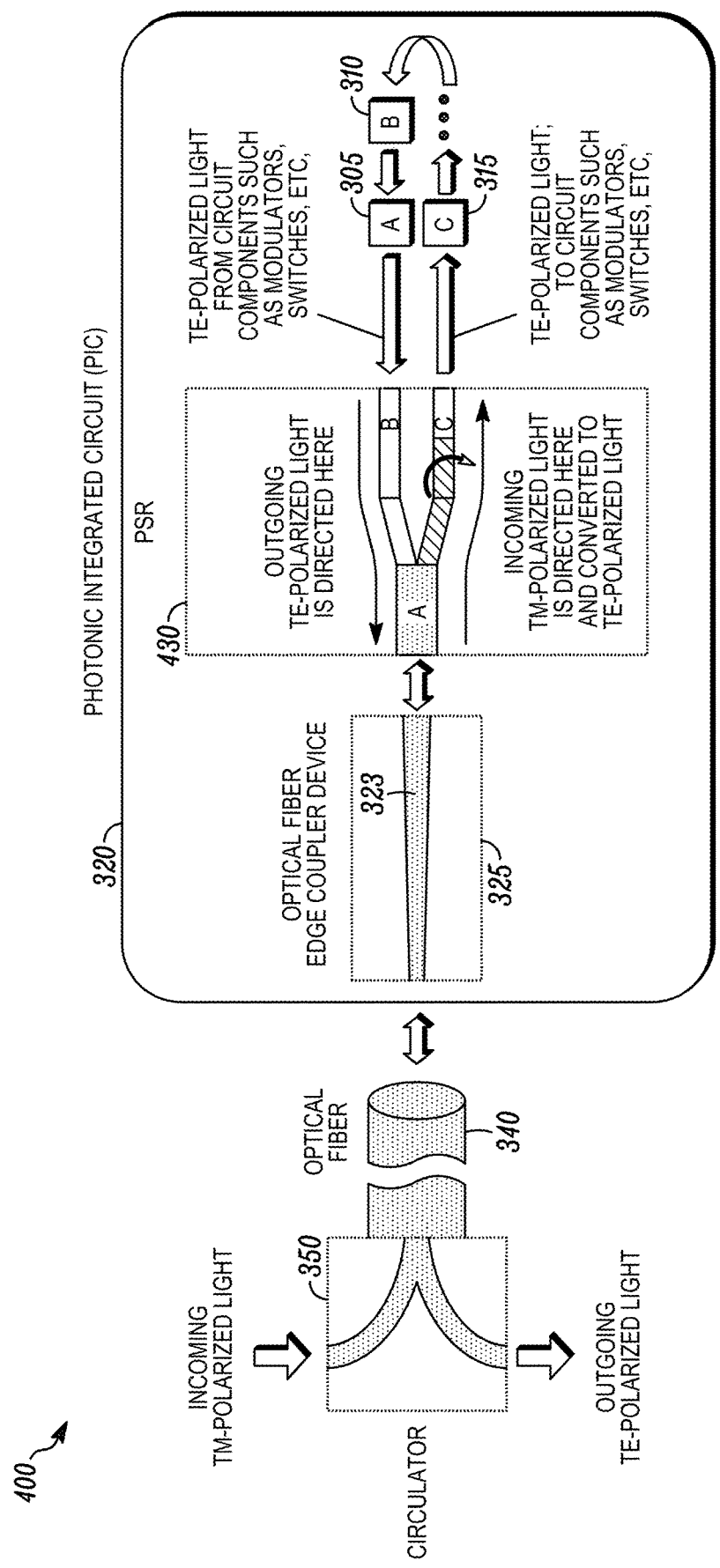
FIG. 5 shows another example of an optical arrangement having illustrative photonic components that operate using TE-polarized light.

FIG. 5 shows an optical system 400 that includes PIC 320 on which PSR 430 is located instead of the PSR 330 shown in FIG. 4. Similar to PSR 330, PSR 430 is configured as shown in FIG. 2, but in FIG. 5 the incoming light is TM-polarized and the outgoing light TE-polarized. The remaining elements shown in FIG. 5 are the same as in FIG. 4, where like elements in these and the following figures are denoted by like reference numerals. In this example incoming TM-polarized light from the optical waveguide 340 is directed to the edge coupler 325. The edge coupler 325 communicates TM-polarized light from the optical waveguide 340 to port A of the splitter section of the PSR 430. The incoming TM-polarized light is directed to port C of the polarization-rotator section of the PSR 430, which rotates the TM-polarized light to TE-polarized light. The TE-polarized light exits port C of the PSR 430 and is provided to photonic components 305, 310 and 315. The TE-polarized light from the photonic components 305, 310 and 315 is received by port B of the polarization-rotator section of the PSR 430, which then exits port A of the PSR 430, in the TE-polarized state. The TE-polarized light enters the edge coupler 325 and exits the PIC 320 through optical waveguide 340. The external optical circulator 350 is used to separate the incoming TM-polarized light from the outgoing TE-polarized light.

Figure 6:
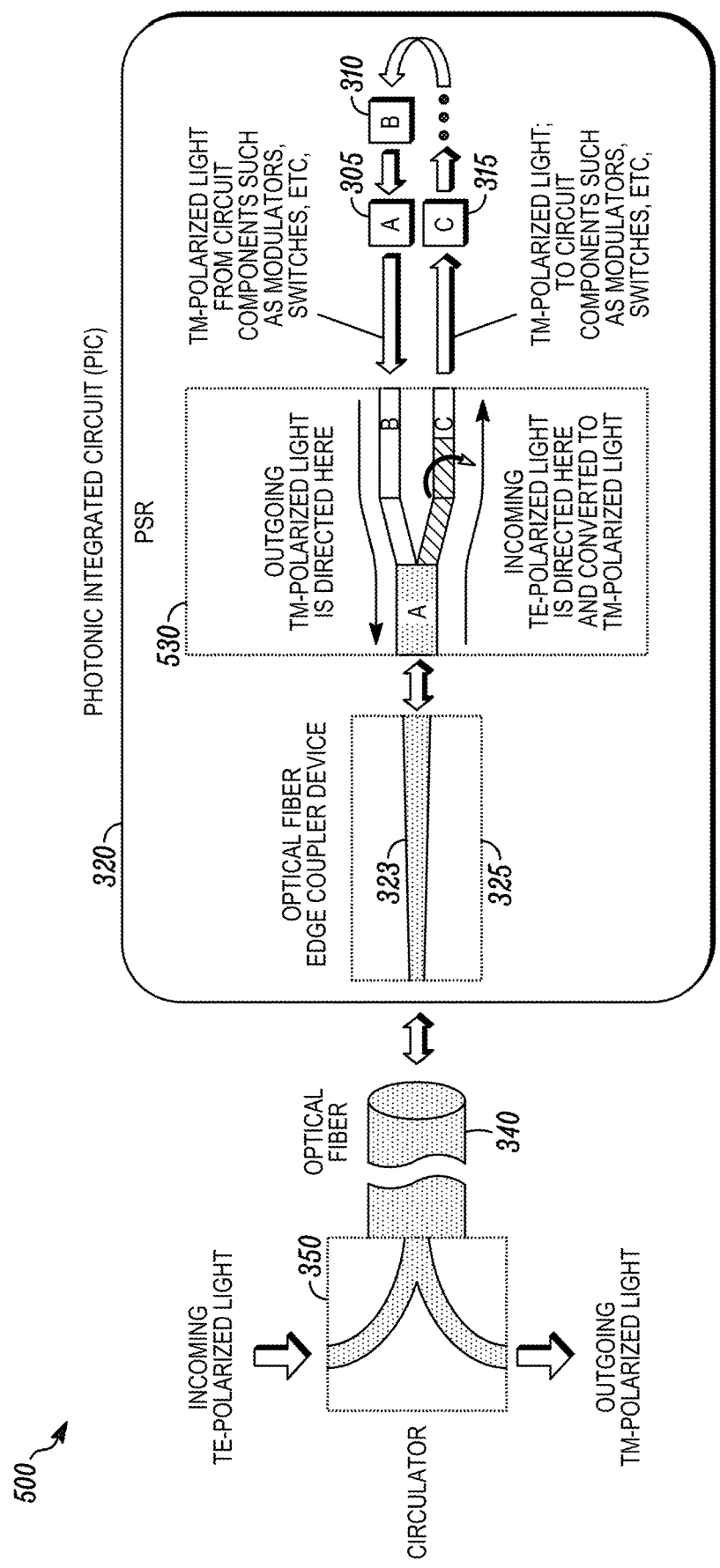
FIG. 6 shows one example of an optical arrangement having illustrative photonic components that operate using TM-polarized light.
Figure 7:
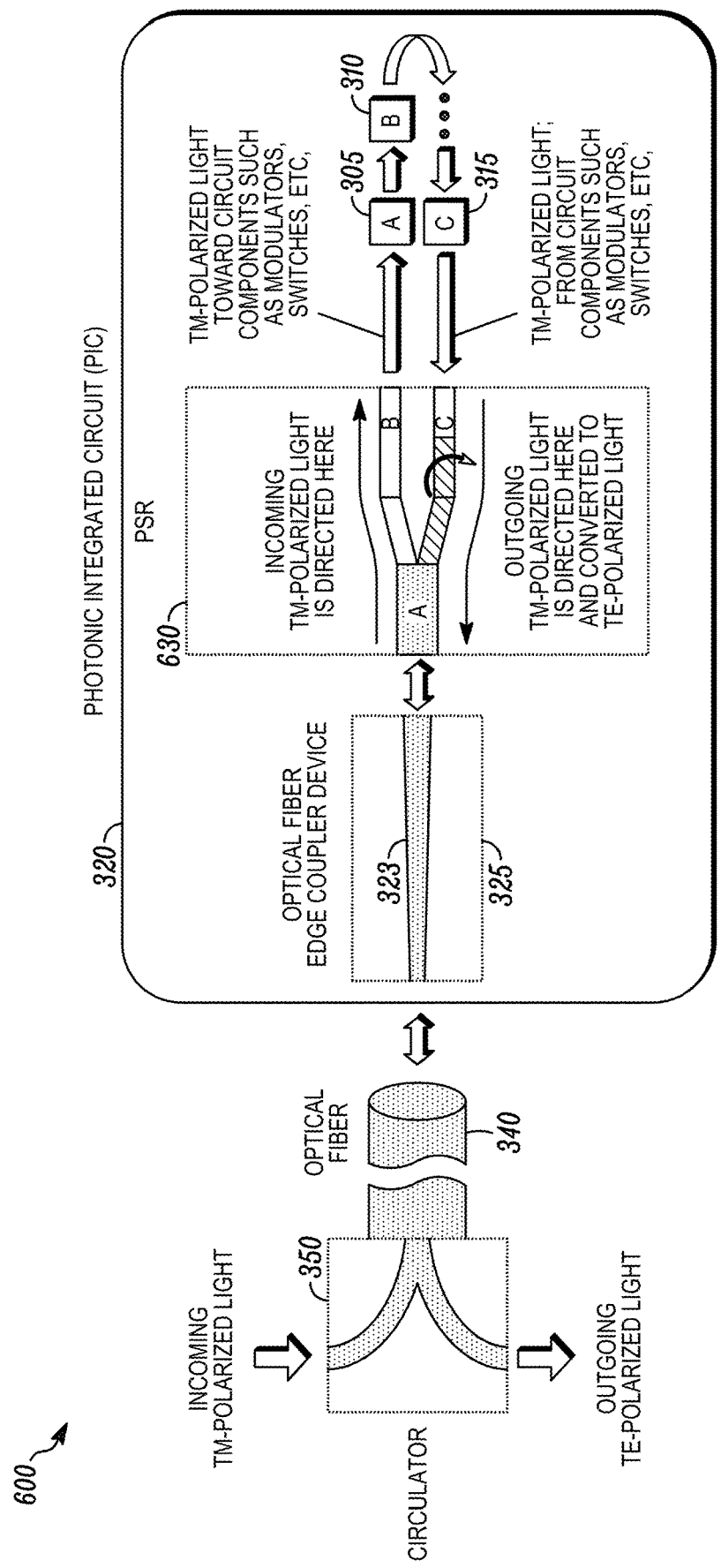
FIG. 7 shows another example of an optical arrangement having illustrative photonic components that operate using TE-polarized light.

FIG. 6 shows another optical system 500 that includes PIC 320 on which PSR 530 is located instead of the PSR 330 shown in FIG. 7. PSR 530 is configured as shown in FIG. 3. In this example the incoming light is TE-polarized and the outgoing light TM-polarized. The incoming TE-polarized light from the optical waveguide 340 is directed to the edge coupler 325. The edge coupler 325 communicates TE-polarized light from the optical waveguide 340 to port A of the splitter section of the PSR 530. The incoming TE-polarized light is directed to port C of the polarization-rotator section of the PSR 530, which rotates the TE-polarized light to TM-polarized light. The TM-polarized light exits port C of the PSR 530 and is provided to photonic components 305, 310 and 315. The TM-polarized light from the photonic components 305, 310 and 315 is received by port B of the polarization-rotator section of the PSR 530, which then exits port A of the PSR 430 in the TM-polarized state. The TM-polarized light enters the edge coupler 325 and exits the PIC 320 through optical waveguide 340. The external optical circulator 350 is used to separate the incoming TE-polarized light from the outgoing TM-polarized light.

FIG. 7 shows yet another optical system 600 that includes PIC 320 on which PSR 630 is located instead of the PSR 330 shown in FIG. 4. Similar to PSR 530 in FIG. 6, PSR 630 is configured as shown in FIG. 3. In this example the incoming light is TM-polarized and the outgoing light TE-polarized. The incoming TM-polarized light from the optical waveguide 340 is directed to the edge coupler 325. The edge coupler 325 communicates TM-polarized light from the optical waveguide 340 to port A of the splitter section of the PSR 630. The incoming TM-polarized light is directed to port B of the polarization-rotator section of the PSR 630. The TM-polarized light exits port B of the PSR 630 and is provided to photonic components 305, 310 and 315. The TM-polarized light from the photonic components 305, 310 and 315 is received by port C of the polarization-rotator section of the PSR 630, which rotates the TM-polarized light to TE-polarized light. The TE-polarized light then exits port A of the PSR 630 in the TE-polarized state. The TE-polarized light enters the edge coupler 325 and exits the PIC 320 through optical waveguide 340. The external optical circulator 350 is used to separate the incoming TM-polarized light from the outgoing TE-polarized light.

The PSRs shown in FIGS. 4-7 may be fabricated in accordance with any suitable techniques compatible with PIC fabrication techniques. For example, illustrative examples of suitable compact PSRs may be found in the following references: D. Dai and J. E. Bowers, "Novel concept for ultracompact polarization splitter-rotator based on silicon nanowires," Optics Express 19(10), 10940-10949 (2011); D. Dai and H. Wu, "Realization of a compact polarization splitter-rotator on silicon," Optics Letters 41(10), 2346-2349 (2016); Y. Ma, Y. Liu, H. Guan, A. Gazman, Q. Li, R. Ding, Y. Li, K. Bergman, T. Baehr-Jones, and M. Hochberg, "Symmetrical polarization splitter/rotator design and application in a polarization insensitive WDM receiver," Optics Express 23(12), 16052-16062 (2015); and Y. Ding, L. Liu, C. Peucheret, and H. Ou, "Fabrication tolerant polarization splitter and rotator based on a tapered directional coupler," Optics Express 20(18), 20021-20027 (2012).

For instance, the PSR shown in the aforementioned reference to D. Dai and J. E. Bowers combines an adiabatic taper and an asymmetrical directional coupler (ADC) to create a compact PSR on a silicon on insulator (SOI) platform. With this PSR, the launched TE fundamental mode ($TE_0$) exits from the through port (e.g., port B in FIGS. 2-7), while the launched TM fundamental mode ($TM_0$) is converted to the $TE_0$ mode and is output from the cross port (e.g., port C in FIGS. 2-7). The adiabatic taper creates a higher order mode ($TE_1$) from the input $TM_0$ and the subsequent ADC converts the higher order mode to $TE_0$ and directs it toward the cross port (e.g., port C in FIGS. 2-7). With $TE_0$ input, the mode passes through the adiabatic taper unchanged and the ADC directs it to the through port (e.g., port B in FIGS. 2-7).

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for transferring optical signals to and from an optical component incorporated in a photonic integrated circuit (PIC), comprising:
   receiving an incoming optical signal in a first polarization state at a splitter section of a polarization splitter rotator (PSR), the splitter section causing the incoming optical signal to be directed to a first waveguide branch section of a pair of waveguide branch sections of the PSR, one of the waveguide branch sections rotating a polarization state of an optical signal traversing therethrough into an orthogonal polarization state and the other waveguide branch section maintaining a polarization state of an optical signal traversing therethrough;
   directing the incoming optical signal from the first waveguide branch section to the optical component; and
   receiving an outgoing optical signal in a second waveguide branch section in the pair of waveguide sections such that the outgoing optical signal traverses the second waveguide branch section and the splitter section to be output by the PSR.

2. The method of claim 1, wherein the first waveguide branch section of the PSR that receives the incoming optical signal rotates the polarization state of the incoming optical signal to the orthogonal polarization state.

3. The method of claim 2, wherein the incoming optical signal is in a TM polarized state.

4. The method of claim 2, wherein the incoming optical signal is in a TE polarized state.

5. The method of claim 1, wherein the second waveguide branch section of the PSR that receives the outgoing optical signal rotates the polarization state of the outgoing optical signal to the orthogonal polarization state.

6. The method of claim 5, wherein the incoming optical signal is in a TE polarized state.

7. The method of claim 5, wherein the incoming optical signal is in a TM polarized state.

8. The method of claim 1, further comprising directing the output optical signal that is output by the PSR to an optical fiber edge coupler on the PIC.

9. The method of claim 1, further comprising directing the output optical signal that is output by the PSR to an optical fiber grating coupler on the PIC.

10. The method of claim 1, further comprising directing the output optical signal that is output by the PSR to a device that transfers optical signals to or from the PIC.

11. The method of claim 10, wherein the splitter section causing the incoming optical signal to be directed to the first waveguide branch section causes the incoming optical signal to be directed to the first waveguide branch section in accordance with multi-mode interference (MMI) that arises in the splitter section.

12. The method of claim 10, wherein the splitter section causing the incoming optical signal to be directed to the first waveguide branch section causes the incoming optical signal to be directed to the first waveguide branch section in accordance with Coupled Mode Theory (CMT).

13. A photonic integrated circuit, comprising:
   at least one optical component disposed on a substrate;
   an input/output device disposed on the substrate for transferring optical signals between the PIC and at least one optical waveguide; and
   a polarization splitter rotator (PSR) disposed on the substrate, the PSR including a splitter section and a pair of waveguide branch sections that receive orthogonal polarization state components of an optical signal from the splitter section, one of the waveguide branch sections rotating a polarization state of an optical signal traversing therethrough into an orthogonal polarization state and the other waveguide branch section maintaining a polarization state of an optical signal traversing therethrough, the splitter section being in optical communication with the input/output device for communicating optical signals therebetween and the waveguide branch sections being in optical communication with the at least one optical component for communicating optical signals therebetween.

14. The photonic integrated circuit of claim 13, wherein the input/output device includes an edge coupler.

15. The photonic integrated circuit of claim 13, wherein the at least one optical waveguide includes an optical fiber and the input/output device includes an optical fiber edge coupler.

16. The photonic integrated circuit of claim 13, wherein the input/output device includes an inverse taper polymer waveguide coupler.

17. The photonic integrated circuit of claim 13, further comprising an optical fiber in optical communication with the input/output device.

18. The photonic integrated circuit of claim 13, further comprising a polymer waveguide in optical communication with the input/output device.

19. The photonic integrated circuit of claim 13, wherein the optical waveguide has a first end portion in optical communication with the input/output device and further comprising an optical circulator in optical communication with a second end of the optical waveguide.

20. The photonic integrated circuit of claim 13, wherein the splitter section causes an optical signal to be directed to the waveguide branch sections in accordance with Coupled Mode Theory (CMT).

21. The photonic integrated circuit of claim 13, wherein the splitter section causes an optical signal to be directed to the waveguide branch sections in accordance with MMI.

* * * * *